United States Patent
Sato

(10) Patent No.: US 10,839,146 B2
(45) Date of Patent: Nov. 17, 2020

(54) INFORMATION PROCESSING SYSTEM, INFORMATION PROCESSING APPARATUS, CONTROL METHOD, AND STORAGE MEDIUM

(71) Applicant: CANON KABUSHIKI KAISHA, Tokyo (JP)

(72) Inventor: Yuichiro Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 15/057,430

(22) Filed: Mar. 1, 2016

(65) Prior Publication Data

US 2016/0259771 A1 Sep. 8, 2016

(30) Foreign Application Priority Data

Mar. 2, 2015 (JP) ................. 2015-040219

(51) Int. Cl.
*G06F 17/20* (2006.01)
*G06F 40/174* (2020.01)
*G06F 3/12* (2006.01)

(52) U.S. Cl.
CPC .......... *G06F 40/174* (2020.01); *G06F 3/1208* (2013.01); *G06F 3/1243* (2013.01); *G06F 3/1256* (2013.01); *G06F 3/1285* (2013.01)

(58) Field of Classification Search
CPC ..... G06F 17/211; G06F 17/243; G06F 40/174
See application file for complete search history.

(56) References Cited

U.S. PATENT DOCUMENTS

| | | | |
|---|---|---|---|
| 7,802,186 B2* | 9/2010 | Burke | G06F 9/451 715/709 |
| 8,174,724 B2 | 5/2012 | Kitora et al. | 358/1.18 |
| 8,339,619 B2* | 12/2012 | Misawa | G06K 9/00442 358/1.13 |
| 8,463,738 B2 | 6/2013 | Mizuguchi et al. | |

(Continued)

FOREIGN PATENT DOCUMENTS

| | | |
|---|---|---|
| JP | 2005-190432 A | 7/2005 |
| JP | 2005-352777 | 12/2005 |

(Continued)

OTHER PUBLICATIONS

JP Office Action dated Oct. 30, 2018 in counterpart JP Application No. 2015-040219 with English translation.

*Primary Examiner* — Keith D Bloomquist
(74) *Attorney, Agent, or Firm* — Venable LLP

(57) ABSTRACT

There are provided a form generation unit configured to generate form data by performing an overlay process on form information and field data of a form, a storage unit configured to acquire and store character string information rendered in the overlay process, a conversion unit configured to convert the generated form data into editable form data, an acquisition unit configured to acquire character string elements from the editable form data, a grouping unit configured to group the acquired character string elements according to a result of comparing the acquired character string elements with the stored character string information, and a browsing screen generation unit configured to generate data for displaying a browsing screen for browsing and editing the editable form data including the grouped character string elements.

8 Claims, 13 Drawing Sheets

(56) References Cited

U.S. PATENT DOCUMENTS

| | | | |
|---|---|---|---|
| 8,792,730 B2* | 7/2014 | Barrus | G06K 9/00463 382/224 |
| 2005/0105148 A1* | 5/2005 | Misawa | G06K 9/00442 358/537 |
| 2006/0055961 A1* | 3/2006 | Toda | H04N 1/3872 358/1.15 |
| 2006/0059462 A1* | 3/2006 | Yamamoto | G06F 17/30861 717/115 |
| 2006/0195787 A1* | 8/2006 | Topiwala | G06Q 10/107 715/700 |
| 2007/0300145 A1* | 12/2007 | Perelman | G06F 17/243 715/222 |
| 2008/0235578 A1* | 9/2008 | Heed | G06F 17/30905 715/269 |
| 2009/0016605 A1* | 1/2009 | Chao | G06F 17/248 382/176 |
| 2009/0225365 A1 | 9/2009 | Hayakawa | 358/1.15 |
| 2009/0254803 A1* | 10/2009 | Bayne | G06F 17/243 715/222 |
| 2009/0328149 A1* | 12/2009 | Lyons | G06F 17/243 726/3 |
| 2010/0067023 A1* | 3/2010 | Ito | H04N 1/41 358/1.2 |
| 2010/0251092 A1* | 9/2010 | Sun | G06F 17/243 715/222 |
| 2010/0318525 A1 | 12/2010 | Mizuguchi et al. | |
| 2012/0140251 A1* | 6/2012 | Grodsky | G06F 3/1206 358/1.9 |
| 2012/0271657 A1* | 10/2012 | Anderson | G06F 17/243 705/4 |
| 2013/0097490 A1* | 4/2013 | Kotler | G06F 17/21 715/255 |
| 2013/0129218 A1* | 5/2013 | Barrett | G06Q 20/401 382/182 |
| 2013/0177201 A1* | 7/2013 | Fisher | G06K 9/3208 382/103 |
| 2013/0236110 A1* | 9/2013 | Barrus | G06K 9/00463 382/224 |
| 2013/0238966 A1* | 9/2013 | Barrus | G06K 9/00449 715/223 |
| 2014/0033016 A1* | 1/2014 | Perelman | G06F 17/243 715/234 |
| 2014/0313216 A1* | 10/2014 | Steingrimsson | G06K 9/00402 345/589 |
| 2016/0062976 A1* | 3/2016 | Wang | G06F 17/243 715/222 |
| 2016/0179772 A1* | 6/2016 | Perrin | G06F 3/04883 715/268 |
| 2016/0253303 A1* | 9/2016 | Pennington | G06F 17/243 715/226 |

FOREIGN PATENT DOCUMENTS

| | | |
|---|---|---|
| JP | 2007-95102 A | 4/2007 |
| JP | 2009-218711 | 9/2009 |
| JP | 2010-092141 | 4/2010 |
| WO | 2009/110550 A1 | 9/2009 |

\* cited by examiner

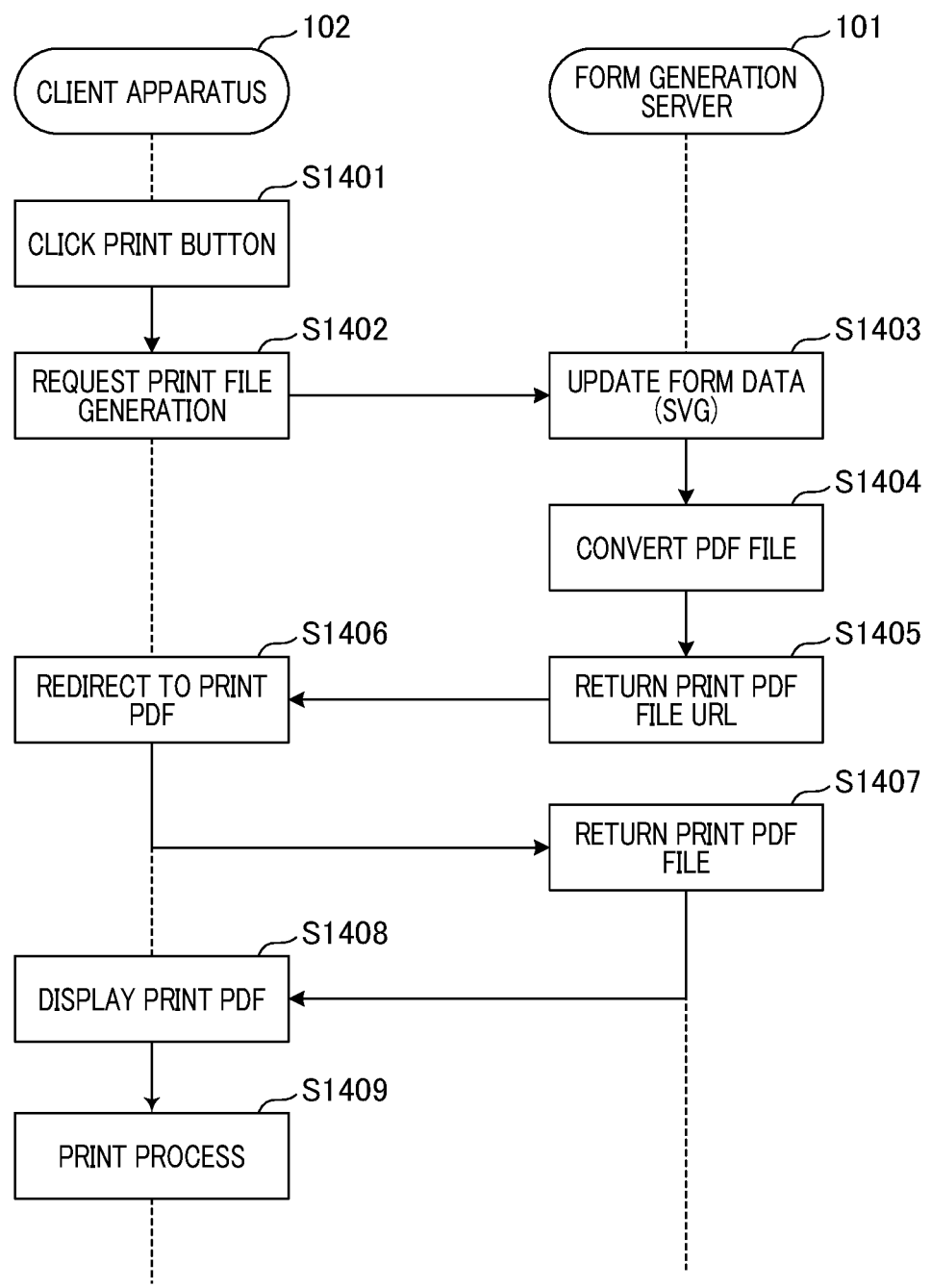

INFORMATION PROCESSING SYSTEM, INFORMATION PROCESSING APPARATUS, CONTROL METHOD, AND STORAGE MEDIUM

BACKGROUND OF THE INVENTION

Field of the Invention

The present invention relates to an information processing system, an information processing apparatus, a control method, and a storage medium.

Description of the Related Art

Recently, cloud computing systems have started to become widespread as a form for managing business data or performing various types of processing on a server side. For example, business forms for the operation of a company are one target of such systems. First, a user accesses a web page of a cloud server computer via the Internet from a browser of a client computer and browses an electronic form on the web page. The number of cases in which a form to be browsed according to a work flow is edited and printed is expected to increase.

In addition, there is form generation technology for converting a print form to be created by a form overlay process into a PDF format and previewing the form. However, because a PDF file is not suitable for editing, editing after converting the PDF file into scalable vector graphics (SVG) is considered. However, because a print form PDF is obtained through conversion from rendering information, the division into a plurality of character strings may be performed in a process of conversion into SVG. In addition, because the print form PDF is obtained through conversion of rendering information of a print form obtained by a form overlay process into a PDF format, character strings maybe divided and rendered according to a specification of an application, a graphics device interface (GDI), or the like.

Therefore, when the above-described PDF file is converted into a file in an SVG format, a character string within the SVG file may be divided into a plurality of character strings. For example, one character string object representing an item such as "orange juice" maybe divided into a plurality of character string objects such as "oran" and "ge juice."

Because a web application recognizes each character string obtained through division as a separate character string when a character string is divided as described above, it is difficult to select or edit the character strings in meaningful units. Therefore, the publication of WO 09/110550 discloses technology for extracting a set of character strings arranged in one direction as a group of the same attribute. In addition, Japanese Patent Laid-Open No. 2007-095102, discloses technology for performing a grouping process of detecting a decorative line or a surrounding frame, extracting regions surrounded by the decorative line or the surrounding frame, and grouping content thereof. In addition, Japanese Patent Laid-Open No. 2005-190432, discloses technology for displaying an imaged form as a web page and editing and updating a character string thereof.

However, when a character string is divided as described above, the user cannot select or edit the character strings in meaningful units. In addition, character strings for which rendering is arranged in one direction are grouped in the publication of WO 09/110550, but it is difficult to detect the character strings as a set of a plurality of character strings when the set of the plurality of character strings are on the same line. In Japanese Patent Laid-Open No. 2007-095102, it is difficult to perform grouping when there is no actually rendered information such as a surrounding frame. In Japanese Patent Laid-Open No. 2005-190432, it is necessary to manually perform a grouping operation every time a form or field data is added or changed because it is necessary to manually group a set of editable character strings in advance.

SUMMARY OF THE INVENTION

The present invention provides an information processing system configured to manipulate a plurality of character string elements as one character string even when the character string elements are divided at the time of conversion from form data into editable form data.

According to an embodiment of the present invention, there is provided an information processing system including: a form generation unit configured to generate form data by performing an overlay process on form information and field data of a form; a storage unit configured to acquire and store character string information rendered in the overlay process; a conversion unit configured to convert the generated form data into editable form data; an acquisition unit configured to acquire character string elements from the editable form data; a grouping unit configured to group the acquired character string elements according to a result of comparing the acquired character string elements with the stored character string information; and a browsing screen generation unit configured to generate data for displaying a browsing screen for browsing and editing the editable form data including the grouped character string elements.

Further features of the present invention will become apparent from the following description of exemplary embodiments (with reference to the attached drawings).

BRIEF DESCRIPTION OF THE DRAWINGS

FIG. 14 is a flowchart illustrating a process of printing the form browsing screen.

DESCRIPTION OF THE EMBODIMENTS

First Embodiment

First, general overlaying will be described. Overlaying is an example of overlay process. Overlaying is a process of superimposing form information for recording information about a border of a document paper format or the like and data (field data) of a text format and printing the superimposed form information and data. Form information is registered in advance using a function of page registration or form registration provided in a page printer such as a laser printer. When the printing is performed based on field data using the page printer, it is possible to superimpose the form information and the field data and print the superimposed form information and field data using a page information call or form information call function. The above-described superimposition print is defined as overlaying.

Figure 1:
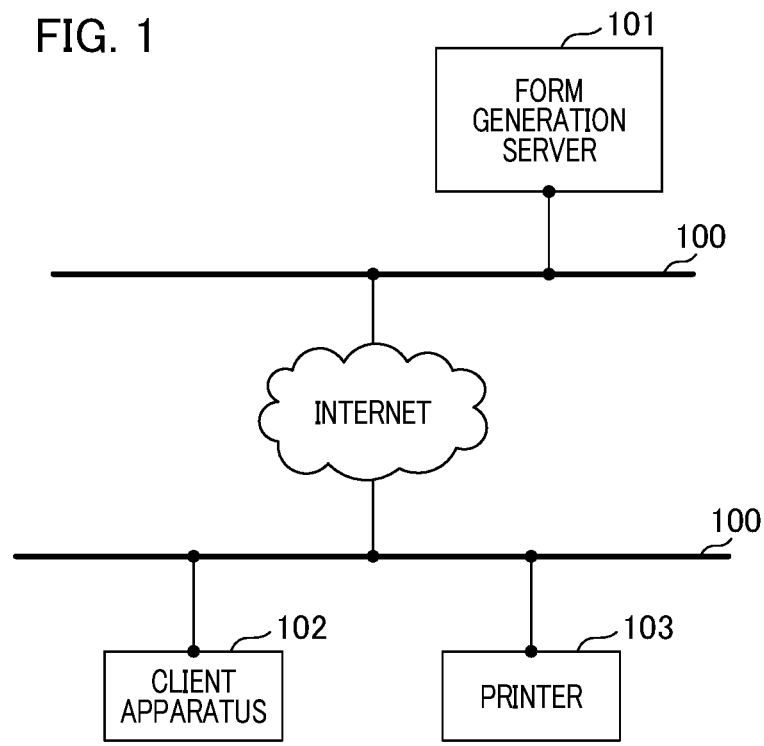
FIG. 1 is a diagram illustrating a configuration of the entire system according to an embodiment of the present invention.

First, FIG. 1 is a diagram illustrating a configuration of the entire system according to an embodiment of the present invention. The system illustrated in FIG. 1 includes a form generation server 101, a client apparatus 102, and a printer 103. The form generation server 101 is an information processing apparatus of this embodiment which executes an overlaying process and a process of generating an electronic form browsing program. That is, the form generation server 101 generates form data by superimposing a field data file which is text data and a form information file including predetermined form information. A form browsing program capable of browsing and editing the form is generated using generated form data in an electronic file format.

The form browsing program of this embodiment is a web application which operates on a web browser capable of being distributed via a network. The web application is an application which operates according to a mash-up language (hypertext markup language (HTML)) representing a web page and a programing language (JavaScript) which operates on a web browser. Also, a form browsing program is executed on a web browser in this embodiment, and a screen to be actually displayed on the web browser is referred to as a form browsing screen. In addition, the form browsing program may be an application to be executed on a computer system rather than an application which operates on the web browser.

The form generation server 101 receives a request from the client apparatus 102 to perform the above-described overlaying process and the process of generating the electronic form browsing program. The printer 103 receives a request from the client apparatus 102 to perform a process of printing form data on paper. In addition, the above-described components are connected to be communicable through a network 100. The network 100, for example, may be any one of a local area network (LAN) such as the Internet, a wide area network (WAN), a telephone line, a dedicated digital line, an asynchronous transfer mode (ATM) or frame relay line, a cable television line, and a data broadcasting wireless line. In addition, the network 100 may be a so-called communication network to be implemented by a combination thereof. That is, the network 100 may transmit and receive data, and a communication unit from the client apparatus 102 to the form generation server 101 may be different from a communication unit from the client apparatus 102 to the printer 103.

Figure 2:
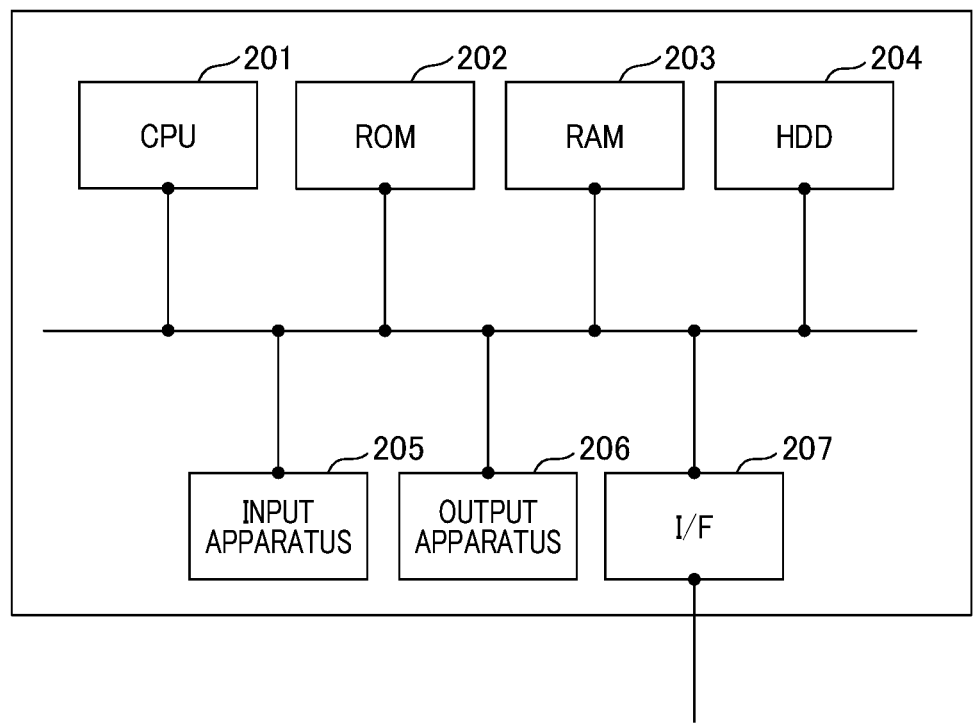
FIG. 2 is a diagram illustrating a configuration of hardware of an information processing apparatus.

Next, FIG. 2 is a block diagram illustrating hardware configurations of the form generation server 101 and the client apparatus 102. A central processing unit (CPU) 201 directly or indirectly controls each device (a read only memory (ROM), a random access memory (RAM), etc.) connected by an internal bus and executes a program for implementing the present invention. In a ROM 202, an embedded program and data are recorded. A RAM 203 is used as a work area of the CPU 201 or used as a temporary storage for loading a computer program (software module) for implementing the present invention.

A hard disk drive (HDD) 204 is a storage apparatus storing an operating system (OS) which is basic software or a software module. Also, the storage apparatus may be an indirect storage apparatus such as a solid state drive (SSD) instead of the HDD 204. An input apparatus 205 is an apparatus for performing an input such as a keyboard (not illustrated) or a pointing device (not illustrated). An output apparatus 206 is an apparatus connected to a display and configured to perform output. An I/F 207 is an interface for connection to the network 100.

When the form generation server 101 or the client apparatus 102 is activated in the above-described hardware, a basic input/output system (BIOS) is executed by the CPU 201 and the OS is loaded from the HDD 204 to the RAM 203 so that the OS is executable. The CPU 201 loads various software modules from the HDD 204 to the RAM 203 according to an operation of the OS at any time so that the software modules are executable. Various types of software modules are executed and operated by the CPU 201 through cooperation of devices. In addition, the I/F 207 is connected to the network 100, controlled by the CPU 201 according to the operation of the OS, and implements communication by the above-described communication unit.

Figure 3:
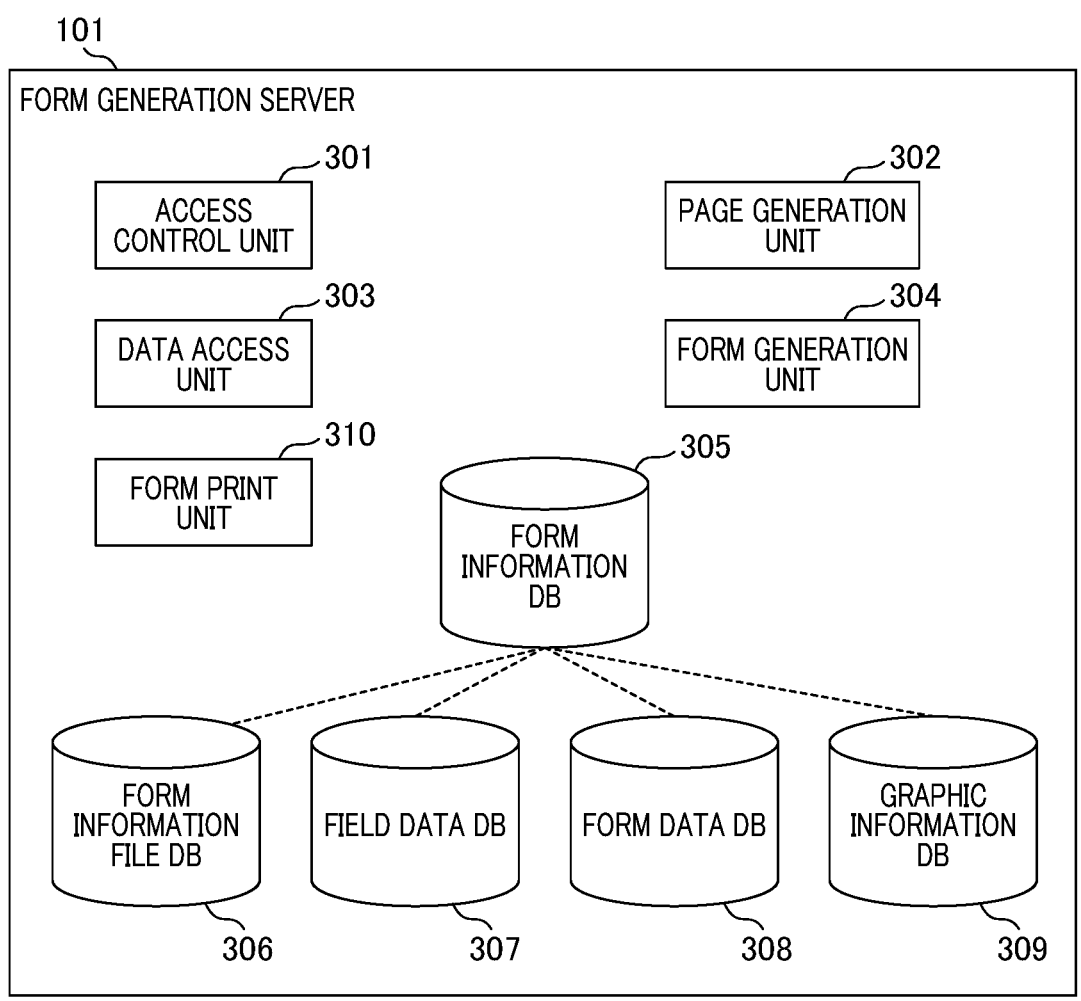
FIG. 3 is a diagram illustrating a configuration of software according to the system of the present invention.

Next, FIG. 3 is a diagram illustrating a configuration example of a software module which operates on the form generation server 101. Each software module is stored in the HDD 204 illustrated in FIG. 2 and loaded to the RAM 203 by the CPU 201 for execution. An access control unit 301 performs user authentication according to a request from the client apparatus 102. A page generation unit 302 generates a web page for returning a response to the client apparatus 102. The page generation unit 302 generates a file of HTML, JavaScript, or the like necessary for a web application which is a form browsing program and returns the generated file to the client apparatus 102.

A data access unit 303 performs an access process for databases (DBs) 305, 306, 307, 308, and 309. The form generation unit 304 generates form data and a graphic information file 801 from form information indicated by a form information file read by the data access unit 303 and field data indicated by a field data file. A form print unit 310 receives a print file generation request from the client apparatus 102 and converts the print file generation request into a printable format.

The form information DB 305 is a DB storing information about a generated form. The form information DB 305 includes data indicating information about a form name or a possessor and has information for specifying a form information file and a field data file necessary for generating the form. Also, the form information DB 305 has form data which is a form overlay result and information for specifying the graphic information file 801. The form information file DB 306 is a DB storing the form information file. The field data DB 307 is a DB storing the field data file.

The form data DB 308 is a DB storing form data generated by the form generation unit 304. The graphic information DB 309 is a DB storing a rendering region of each field generated during overlay processing and a character string to be rendered in a field as the graphic information file 801.

Figure 4:
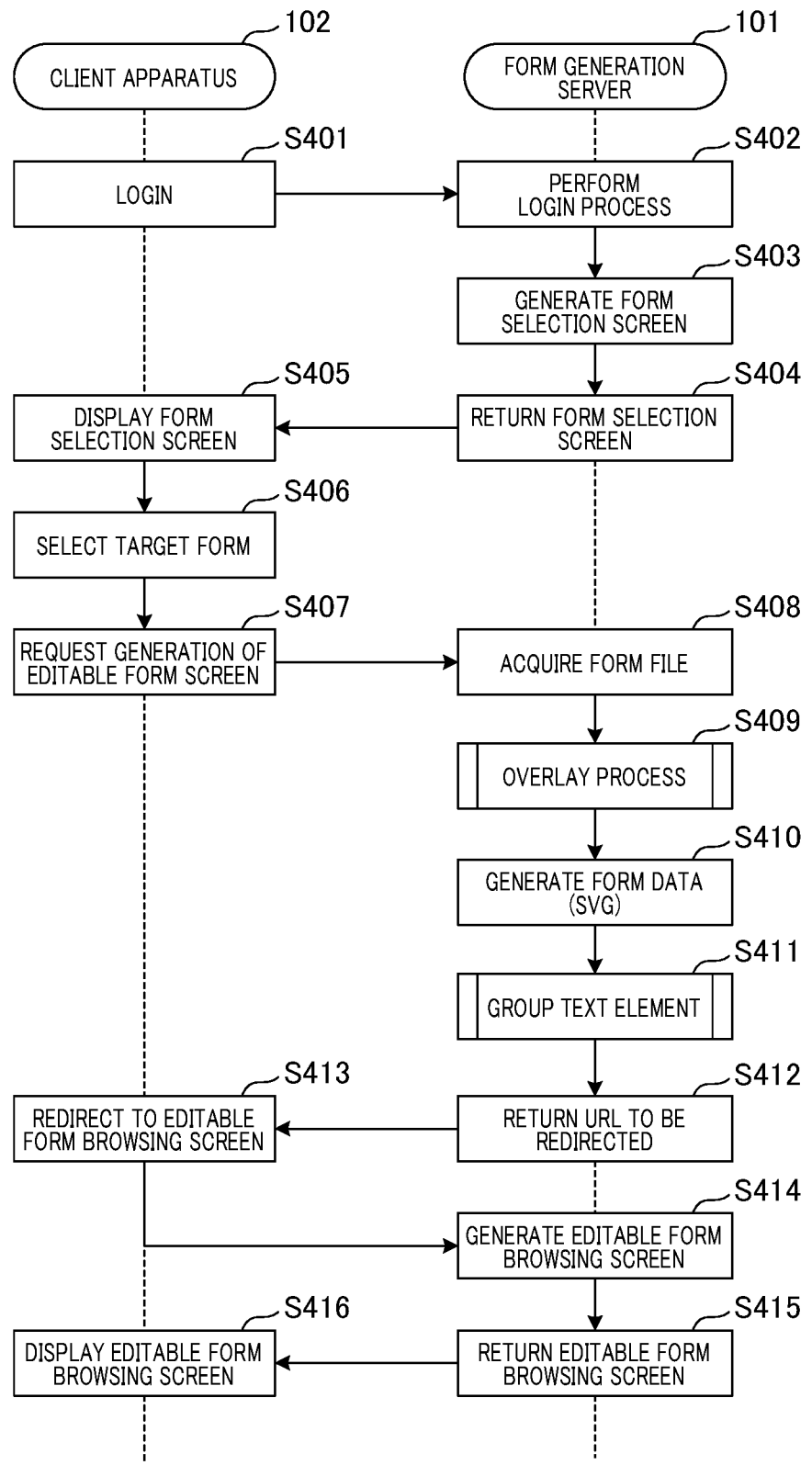
FIG. 4 is a sequence diagram of a process of generating an editable form browsing screen.

Next, a flow of a specific process of this embodiment will be described using FIG. 4. FIG. 4 is a diagram illustrating a sequence of a process of generating an editable form browsing screen 1101. First, in step S401, the user logs in to the form generation server 101 in a login screen (not illustrated) displayed in a web browser of the client apparatus 102. Next, in step S402, the access control unit 301 of the form generation server 101 performs a login process according to content of a login request received from the client apparatus 102. In step S403, the page generation unit 302 of the form generation server 101 generates a form selection screen 701 illustrated in FIG. 7 according to information about a logged-in user.

Figure 7:
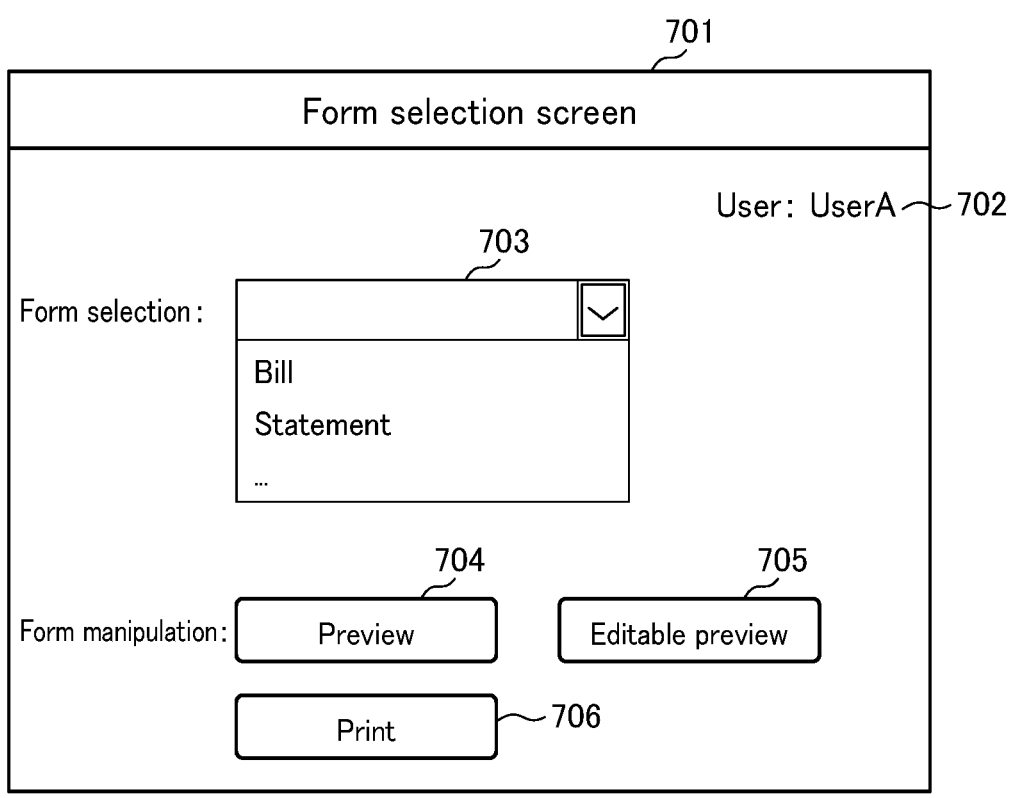
FIG. 7 is a diagram illustrating an example of a form selection screen.

Here, the form selection screen 701 illustrated in FIG. 7 will be described. A region 702 is a region indicating a user name of the user who is currently logged in. A dropdown list 703 displays a form list possessed by the user who is currently logged in. The content displayed in the dropdown list 703 is form names of forms possessed by the logged-in user extracted from the form information DB 305 via the data access unit 303 by the page generation unit 302.

Buttons 704, 705, and 706 are form manipulating buttons and are buttons for executing a preview, editable preview, or print manipulation on the form corresponding to a form name selected in the dropdown list 703. A process after the editable preview button 705 is pressed will be described below, but description of processes after the preview button 704 and the print button 706 are pressed will be omitted.

Here, description will now return to FIG. 4. In step S404, the access control unit 301 of the form generation server 101 returns a form selection screen 701 generated in step S403 to the client apparatus 102 via the network 100. Next, in step S405, the client apparatus 102 receives a response from the form generation server 101 and displays the received response on a web browser. In step S406, the user selects a form name of a form desired to be manipulated from the dropdown list 703 within the form selection screen 701.

Next, in step S407, the user presses the editable preview button 705 within the form selection screen 701, so that the client apparatus 102 transmits a generation request of the editable form browsing screen 1101 to the form generation server 101. In the generation request of the editable form browsing screen 1101, information for specifying a browsing target form is included. In step S408, the form generation unit 304 of the form generation server 101 acquires a form information file and a field data file associated with a browsing target form via the data access unit 303. In step S409, the form generation unit 304 of the form generation server 101 performs an overlaying process using the form information file and the field data file acquired in step S408.

Figure 5:
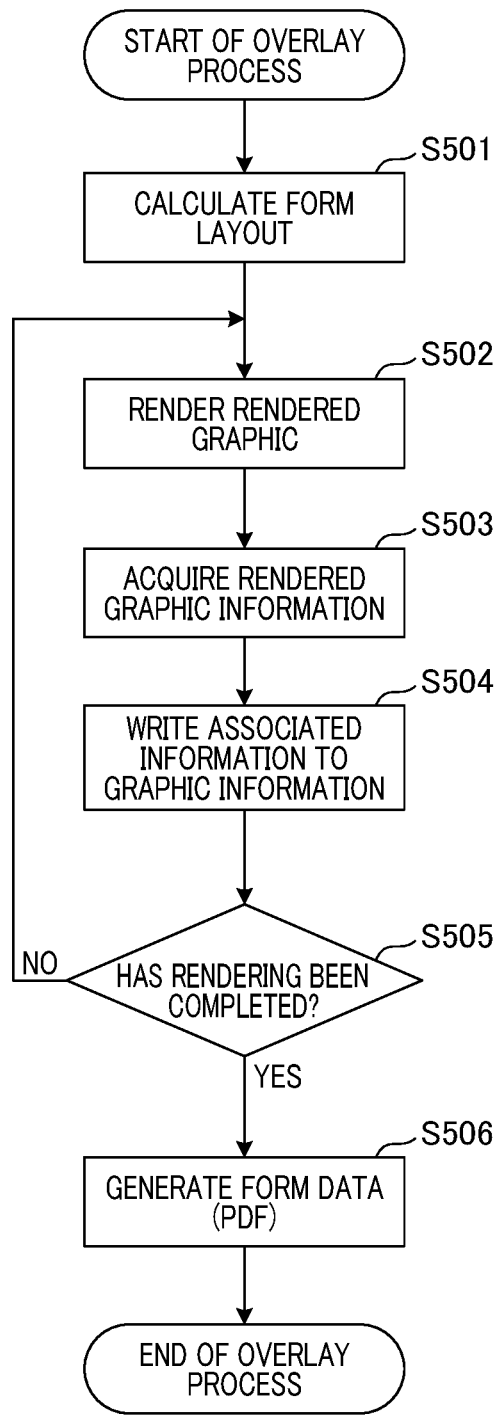
FIG. 5 is a flowchart illustrating an overlaying process.

Here, an overlay process will be described using FIG. 5. FIG. 5 is a flowchart illustrating a flow of a process in which the form generation server 101 in this embodiment designates the form information file and the field data file and performs overlaying.

First, in step S501, a layout configuration of an output form is calculated using the form information file and the field data file acquired in step S408. The layout configuration is information necessary for rendering a form graphic independent of the field data and a field graphic depending upon the field data, and includes region coordinates, a character string to be rendered, decoration information, etc. Also, hereinafter, the form graphic and the field graphic are collectively referred to as a rendered graphic.

Next, in step S502, rendering commands of rendered graphics are sequentially performed according to the layout configuration obtained in step S501. In step S503, the form generation unit 304 acquires information about a target rendered graphic of the rendering command executed in step S502. The acquired information is a rendered graphic name for uniquely identifying a rendered graphic, a rendered character string, and rendering region coordinates of data.

In step S504, the form generation unit 304 performs a process of writing rendered graphic information acquired in step S503 to the graphic information file 801. When there is no graphic information file 801, new creation is performed. In addition, when a plurality of pieces of information are written to the same field, a process of merging different parts is performed as in "data" indicated by a record 804. Next, the form generation unit 304 stores the graphic information file 801 generated via the data access unit 303 in the graphic information DB 309. Information for specifying the generated graphic information file 801 is added to a corresponding record within the form information DB 305.

Figure 8:
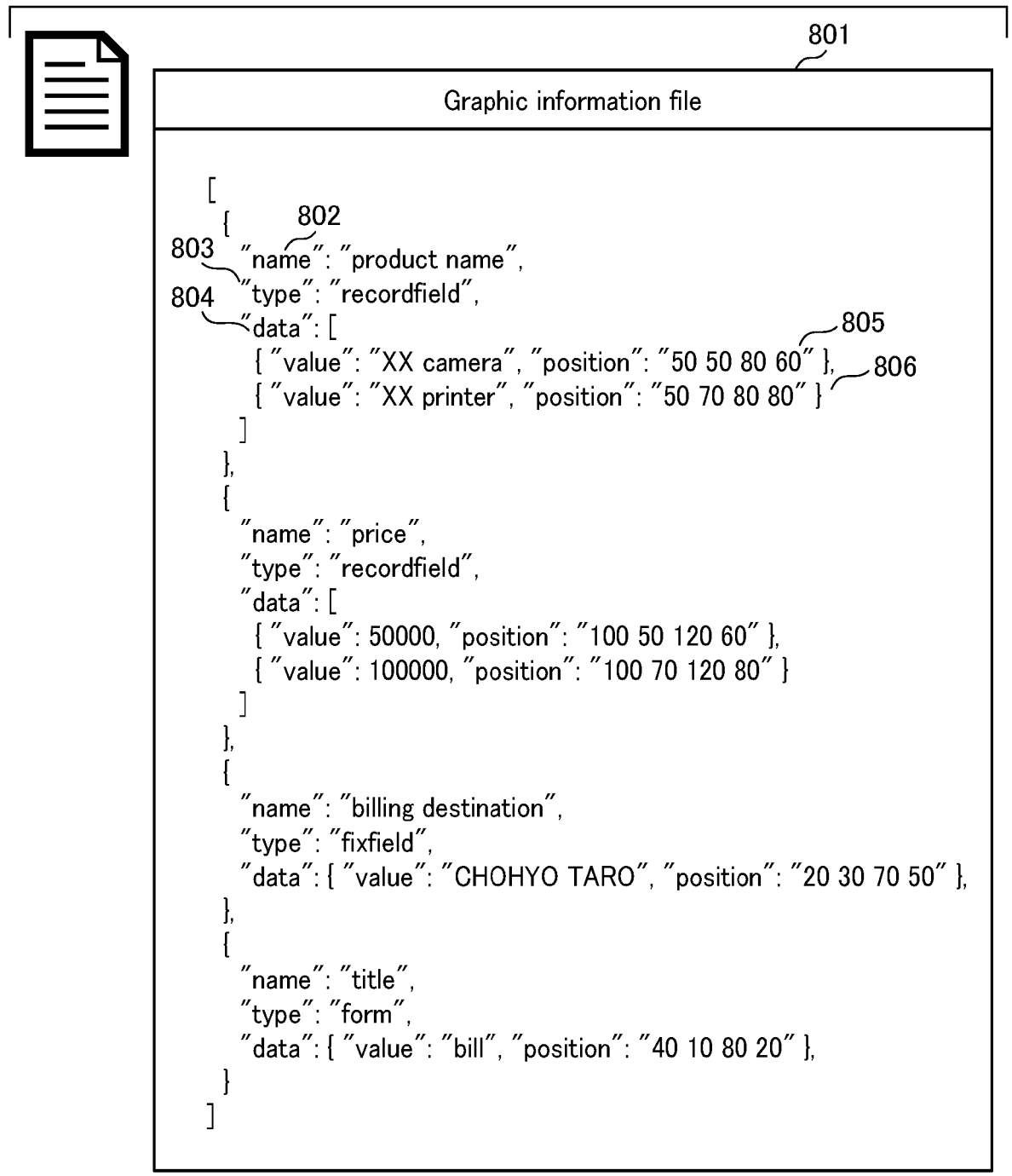
FIG. 8 is a diagram illustrating an example of a graphic information file.

Here, the graphic information file 801 will be described using FIG. 8. FIG. 8 is a diagram illustrating a configuration example of the graphic information file 801. In this embodiment, the graphic information file 801 is in a JavaScript Object Notation (JSON) format. A record 802 indicates a name uniquely indicating a rendered graphic. A record 803 indicates a type of rendered graphic. A record 804 indicates rendering information of data of the rendered graphic. Records 805 and 806 indicate a rendered character string (a value item) and a rendering region coordinate (a position item) of each rendered graphic.

Here, description will now return to FIG. 5. In step S505, the form generation unit 304 determines whether all rendering commands have been completed. When it is determined that all rendering commands have not been completed (No) in step S505, the form generation unit 304 returns to step S502 and performs the next rendering command. On the other hand, when it is determined that all rendering commands have been completed (Yes) in step S505, the form generation unit 304 proceeds to a process of step S506. Next, in step S506, the form generation unit 304 generates form data in a PDF format via a virtual printer using page description language (PDL) information (page description language for indicating rendering for the printer) which is a result of rendering processing.

Here, description will now return to FIG. 4. In step S410, the form generation unit 304 converts form data in a PDF format generated in step S506 into form data in an SVG format. Because the form data in the PDF format cannot be directly edited on a web browser, the form data in the PDF format is changed to an editable format (an SVG format in the case of this embodiment). Next, in step S411, the form generation unit 304 groups SVG character string objects using the graphic information file 801 generated in step S408. Also, although the conversion into the SVG format as the editable format is performed in this embodiment, another format may be used.

Figure 6:
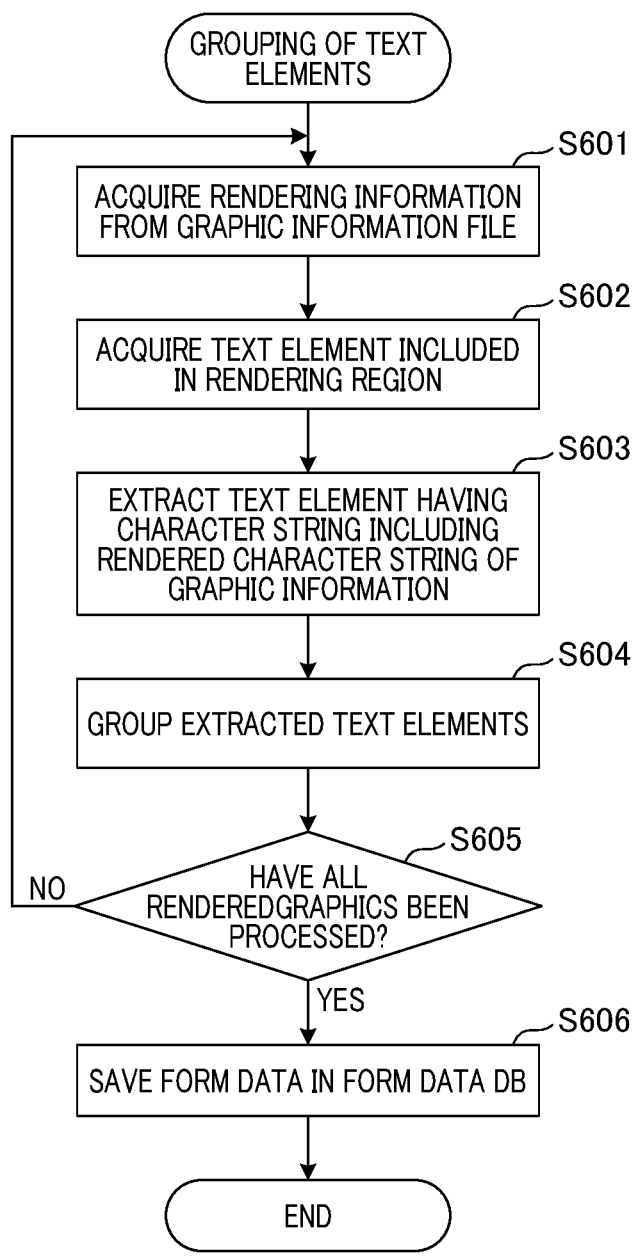
FIG. 6 is a flowchart illustrating a process of grouping character string elements.

Here, description will now return to FIG. 6. FIG. 6 is a flowchart illustrating a flow of a process of grouping SVG character string elements in the form generation server 101 of this embodiment. First, in step S601, the form generation unit 304 acquires the graphic information file 801 generated in step S408 through the data access unit 303. Rendering information about a rendered graphic from the graphic information file 801 is acquired.

Figures 9, 10A, 10B:
FIG. 9 is a diagram illustrating an example of form data in an SVG format.
FIGS. 10A and 10B are diagrams illustrating examples of grouped character string elements.

Next, in step S602, the form generation unit 304 extracts text elements rendered within a rendering region among text elements of the form data in the SVG format. Here, an example of form data 901 in the SVG format is illustrated in FIG. 9. Parts of <text x="40" y="10">CHO</text> and <text x="45" y="10">HYO TARO</text> of FIG. 9 are one character string before conversion, but the one character string is divided into a plurality of parts at a point in time of a text element.

That is, when an example of a "billing destination" indicated by the graphic information file 801 is assumed, text elements included in the rendering region are two of <text x="40" y="10">CHO</text> and <text x="45" y="10">HYO TARO</text>.

Here, description will now return to FIG. 6. In step S603, the form generation unit 304 compares whether a character string of the text elements extracted in step S602 is the rendered character string included in the graphic information file acquired in step S601 and extracts only text elements included in the rendered character string. At this time, a text element having a character string which is not included in the rendered character string is determined to correspond to another rendered graphic in which rendering coordinates overlap and is excluded from a current grouping target.

Next, in step S604, the form generation unit 304 groups text elements. An example of a grouping method is illustrated in FIG. 10. Although a method of surrounding the extracted text element illustrated in FIG. 10A with a g element (tag) is used in this embodiment, another method such as a method of performing conversion into relative coordinates as illustrated in FIG. 10B and arranging the relative coordinates as one text element may be used.

Next, in step S605, it is determined whether grouping for all rendered graphics included in the graphic information file 801 has been completed. When the grouping is not completed (No), the process returns to step S601. On the other hand, when the grouping for all the rendered graphics has been completed (Yes), the process ends. In step S606, the form generation unit 304 stores form data in an SVG format generated via the data access unit 303 in the form data DB 308. Information for specifying the generated form data in the SVG format is added to a corresponding form record within the form information DB 305.

Here, description will now return to FIG. 4. In step S412, the form generation server 101 returns a uniform resource locator (URL) of the editable form browsing screen 1101 of a target form of a request of step S407 to the client apparatus 102. In the URL returned to the client apparatus 102, information for specifying the form data in the SVG format generated in step S411 is included. In this embodiment, a form name of form data associated with form data is included in the URL returned to the client apparatus 102.

Next, in step S413, the client apparatus 102 transmits a request to be redirected to the editable form browsing screen 1101 using the URL returned in step S412 to the form generation server 101. In step S414, the page generation unit 302 (browsing screen generation unit) of the form generation server 101 generates the editable form browsing screen 1101 according to content of a redirect request of step S413. Form data of a request target form and a JavaScript program for controlling browsing, editing, and print manipulations on form data are included in the generated editable form browsing screen 1101. Also, the page generation unit 302 acquires form data associated with a request target form from the form data DB 308 via the data access unit 303 using form name information within the redirect request of step S413.

Next, in step S415, the form generation server 101 returns the editable form browsing screen 1101 generated in step S414 to the client apparatus 102. In step S416, the client apparatus 102 receives a response from the form generation server 101 and displays the editable form browsing screen 1101 in the web browser. Also, the displayed editable form browsing screen 1101 is illustrated in FIG. 11.

Figure 11:
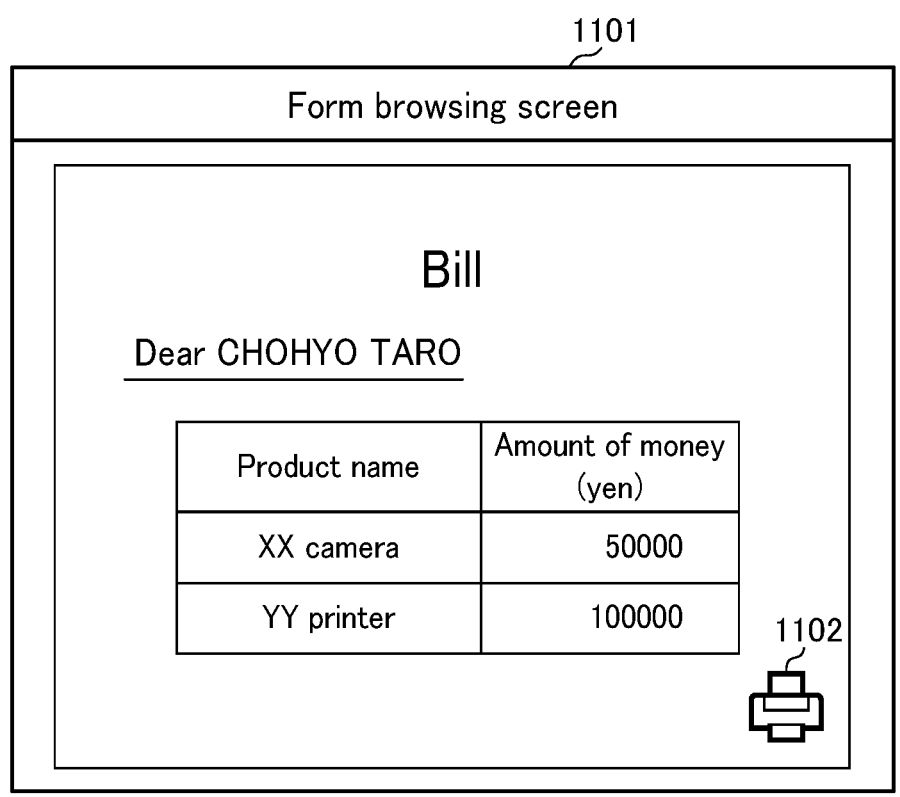
FIG. 11 is a diagram illustrating an example of an editable form browsing screen.

Next, FIG. 11 is a diagram illustrating the editable form browsing screen 1101 in this embodiment. A button 1102 is a button for printing a currently displayed form page. The user performs a selection manipulation such as a click manipulation on a displayed character string, so that an editing program within the editable form browsing screen is operated to perform an editing process illustrated in FIG. 12.

Figure 12:
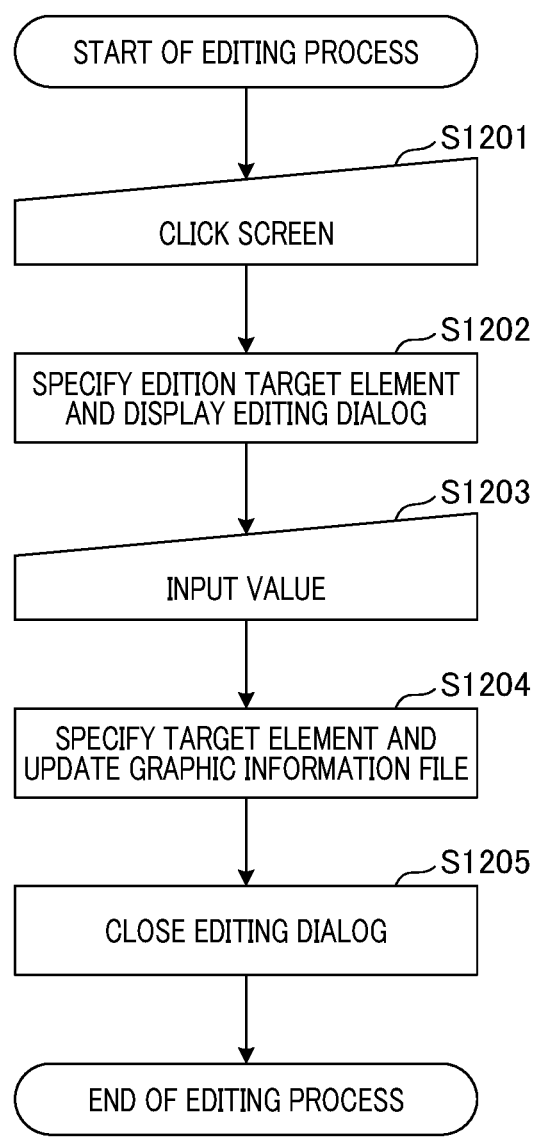
FIG. 12 is a flowchart illustrating an editing process performed on the form browsing screen.
Figure 13A:
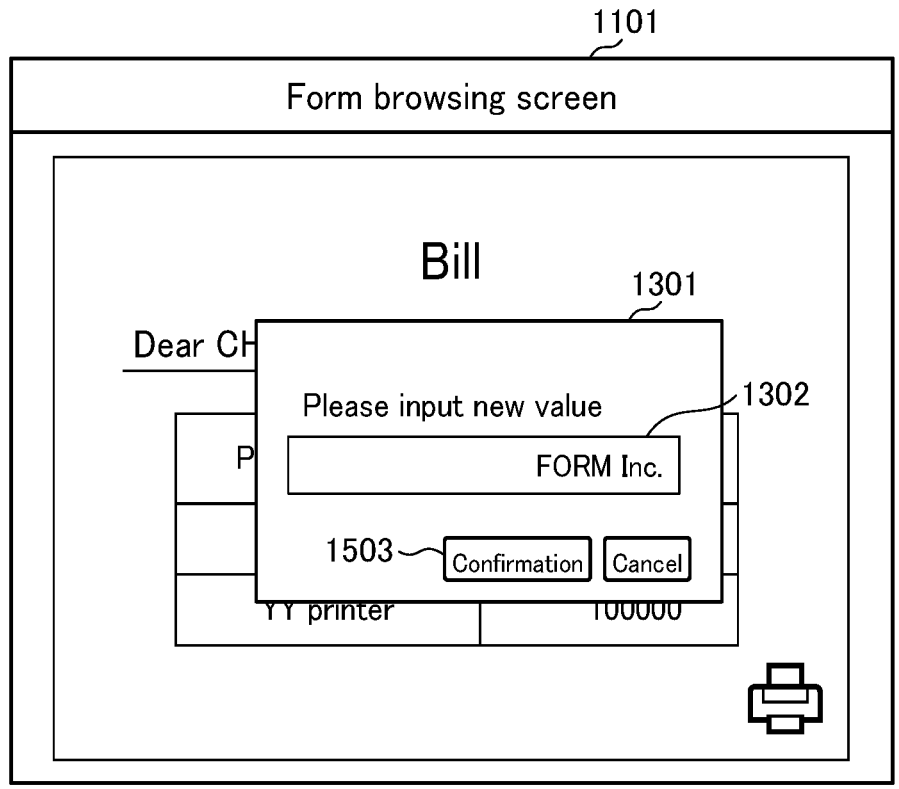
FIGS. 13A and 13B are diagrams illustrating examples of the editable form browsing screen.

Next, FIG. 12 is a flowchart illustrating a flow of the editing process to be performed on the form browsing screen in this embodiment. First, in step S1201, the user performs a click manipulation on a character string of the editable form browsing screen 1101. Next, in step S1202, the editing program within the editable form browsing screen (hereinafter briefly referred to as "editing program") displays an editing dialog 1301 illustrated in FIG. 13A. At this time, character strings of a text element included in a g element clicked in step S1201 are combined and displayed in a text box 1302.

Figure 13B:
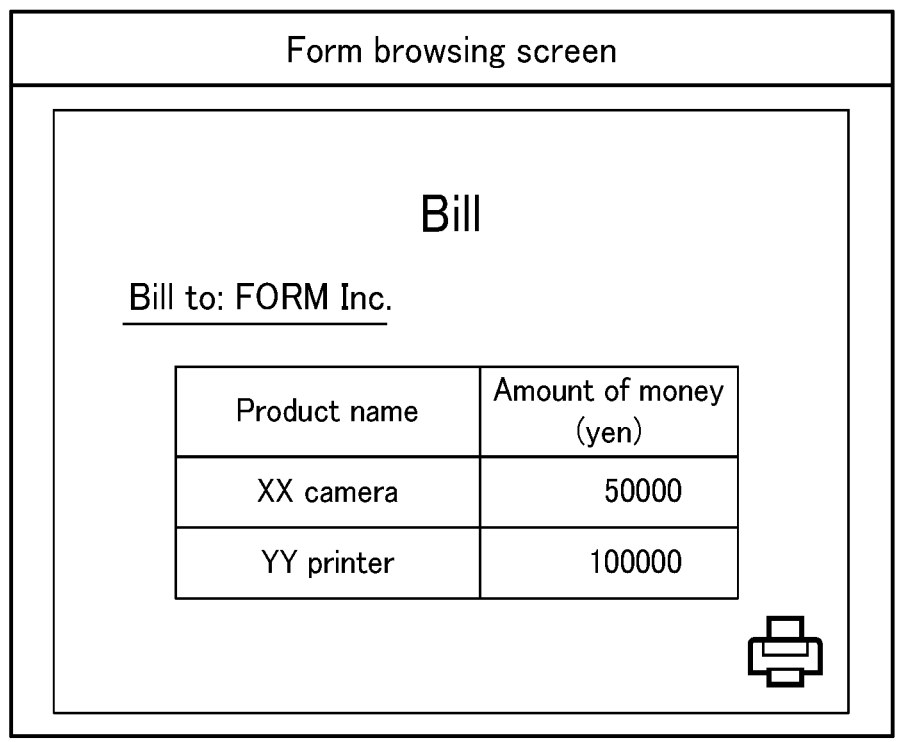

Next, in step S1203, the user inputs a new value to the text box 1302 and clicks a confirmation button 1503. Next, in step S1204, the editing program replaces a value of the text element acquired in step S1202 with a value input by the user in step S1203. In step S1205, the editing dialog 1301 is not displayed. In FIG. 13B, the editable form browsing screen 1101 in which the editing dialog 1301 is not displayed is illustrated.

Next, a print process will be described using FIG. 14. FIG. 14 is a diagram illustrating a sequence of the print process when the print button 1102 of the editable form browsing screen 1101 is pressed in this embodiment. First, when the user presses the print button 1102 of the editable form browsing screen 1101 in step S1401, the client apparatus 102 transmits a request for generating a print file to the form generation server 101 in step S1402. In the request for generating the print file, the form data in the SVG format held by the client apparatus 102 is included. The form data in the SVG format may be edited form data.

Next, in step S1403, the form print unit 310 (print data generation unit) of the form generation server 101 updates form data within the form data DB 308 via the data access unit 303 using the form data within the request of step S1402. In step S1404, the form generation unit 304 converts the form data in the SVG format within the request of step S1402 into a PDF format.

Next, in step S1405, the form generation unit 304 returns a URL for accessing the PDF file (print data) generated in step S1404 to the client apparatus. In step S1406, the client apparatus 102 performs redirection to a URL for accessing a PDF file returned in step S1405. In step S1407, the access control unit 301 of the form generation server 101 returns the PDF file generated in step S1404 to the client apparatus via the data access unit 303.

Next, in step S1408, the client apparatus 102 displays the PDF file using software (Adobe PDF Reader or the like) capable of displaying the PDF file using a web browser. In step S1409, the client apparatus 102 prints the PDF using software capable of printing the PDF file.

As described above, according to this embodiment, character string elements included in a character string provided in the graphic information are grouped when a character string element included in the form data converted into the editable format is included in a character string provided in the graphic information. Thereby, even when the character string is divided at the time of conversion from the form data into a web application, it is possible to provide an information processing system capable of manipulating a plurality of character strings as one character string. In addition, it is possible to group character strings in accordance with content of generated form data even when content of a template form data or field data is changed.

Second Embodiment

In this embodiment, there is no rule in the order of a text element in form data in the SVG format. In this case, when the character string is selected in the editable form browsing screen 1101, characters of grouped text elements are selected and edited in the order of the text element. Specifically, when the text elements are described in the order of <text x="45" y="10">HYO TARO</text> and <text x="40" y="10">CHO</text>, there is no problem in the display. However, because the character strings are acquired in the order of the text element in the editing program, the text element is displayed in the order of "HYO TARO CHO" in the text box 1302.

Figure 15:
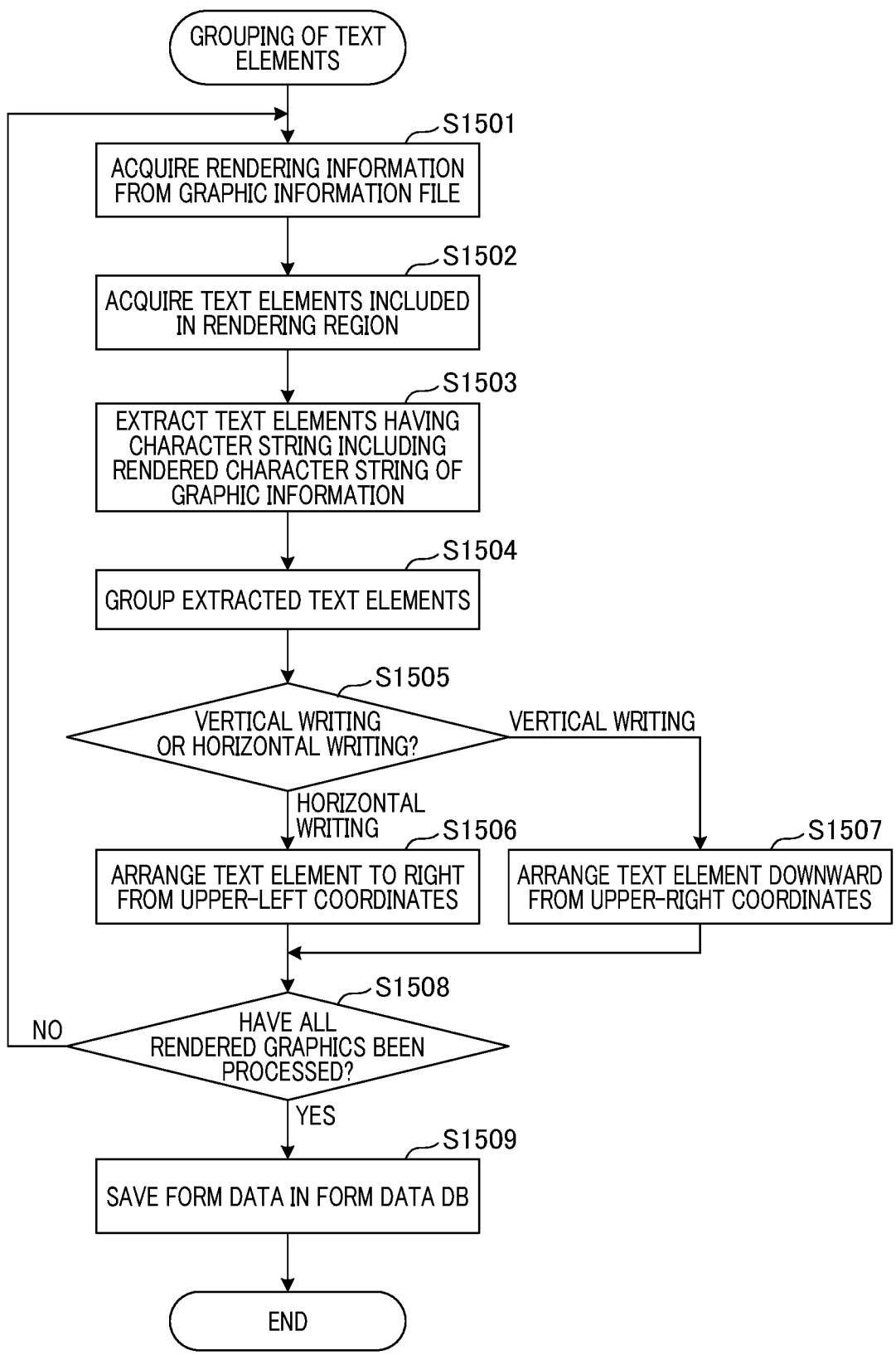
FIG. 15 is a flowchart illustrating a process of grouping character string elements.

In this embodiment, a grouping processing method of editing a character string in the correct order regardless of the order of the text element will be described. Hereinafter, description of a similar process to the first embodiment will be omitted. FIG. 15 is a flowchart illustrating a flow of a grouping process of a character string element of SVG in the form generation server 101 in this embodiment.

First, because steps S1501 to S1504 are similar to steps S601 to S604 illustrated in FIG. 6, description thereof will be omitted. First, in step S1505, the form generation unit 304 determines whether the extracted text element is written horizontally or vertically. In the SVG case, the determination is made according to a writing-mode value of the text element. When vertical writing is designated, the process proceeds to step S1506. On the other hand, in the case of horizontal writing, the process proceeds to step S1507. In step S1506, the form generation unit arranges a rendering region (x and y attributes) of a grouped text element group so as to match the display order of the vertical writing. That is, after x coordinates are sorted in descending order as a first key, y coordinates are sorted in ascending order as a second key.

On the other hand, in step S1507, the form generation unit arranges a rendering region (x and y attributes) of a grouped text element group so as to match the display order of the horizontal writing. That is, after y coordinates are sorted in ascending order as a first key, x coordinates are sorted in ascending order as a second key. Because steps S1508 and S1509 are similar to steps S605 and S606 illustrated in FIG. 6, description thereof will be omitted.

According to the above, regardless of the order in which the text element of SVG is defined, the character string can be selected and edited in the correct character order matching the appearance in the form browsing screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-40219, filed Mar. 2, 2015, which is hereby incorporated by reference wherein in its entirety.

What is claimed is:
1. A server comprising:
a memory that stores a program; and
at least one processor that executes the program to perform:
generating form data in a PDF format using a virtual printer that processes rendering commands, wherein the rendering commands are obtained by performing an overlay process that superimposes form information and field data of a form;
acquiring, from the rendering commands obtained while the overlay process is performed, region coordinates information of each field into which each character string of the field data is rendered in the overlay process, wherein the region coordinates information is acquired without analyzing the generated form data in the PDF format;
storing, in an information file, the acquired region coordinates information in association with each character string to be rendered in each said field, wherein the information file is different from the generated form data;
converting the generated form data into editable form data having a scalable vector graphics (SVG) format, wherein the editable form data having the SVG format is able to be directly edited on a web browser of a client apparatus;
acquiring character string elements from the editable form data;
grouping, in the editable form data having the SVG format, the acquired character string elements into text elements based on the region coordinates information of each character string stored in the information file;
generating data of a browsing screen, wherein the generated data of the browsing screen comprises the editable form data having the SVG format including the grouped text elements and a program for controlling browsing and editing the editable form data; and transmitting the generated data of the browsing screen to the web browser of the client apparatus.

2. The server according to claim 1, wherein the client apparatus receives the transmitted data of the browsing screen, and displays the browsing screen based on the received data, and wherein, when a new character string is input via the browsing screen, the grouped character string elements are replaced with the input character string.

3. The server according to claim 1, wherein the acquired character string elements are grouped into the text elements by comparing positions of the acquired character string elements with the region coordinates information of the character string.

4. The server according to claim 1, wherein the acquired character string elements are grouped into the text elements by enclosing the acquired character string element with a predetermined tag or converting the character string element into relative coordinates to set the acquired character string element as one text element.

5. The server according to claim 1, wherein, in the grouping, it is determined whether the character string elements are written horizontally or vertically, wherein, the grouped character string elements are arranged to match a display sequence of vertical writing when it is determined that the character string element are written vertically, and wherein, the grouped character string elements are arranged to match a display sequence of horizontal writing when it is determined that the character string element are written horizontally.

6. The server according to claim 1, wherein the at least one processor further executes the program to perform:

generating, after the editable form data is edited via the browsing screen, print data based on the edited form data.

7. A non-transitory storage medium storing a computer program for making a computer to perform steps comprising:

generating form data in a PDF format using a virtual printer that processes rendering commands, wherein the rendering commands are obtained by performing an overlay process that superimposes form information and field data of a form;

acquiring, from the rendering commands obtained while the overlay process is performed, region coordinates information of each field into which each character string of the field data is rendered in the overlay process, wherein the region coordinates information is acquired without analyzing the generated form data in the PDF format;

storing, in an information file, the acquired region coordinates information in association with each character string to be rendered in each said field, wherein the information file is different from the generated form data;

converting the generated form data into editable form data having a scalable vector graphics (SVG) format, wherein the editable form data having the SVG format is able to be directly edited on a web browser of a client apparatus;

acquiring character string elements from the editable form data;

grouping, in the editable form data having the SVG format, the acquired character string elements into text elements based on the region coordinates information of each character string stored in the information file;

generating data of a browsing screen, wherein the generated data of the browsing screen comprises the editable form data having the SVG format including the grouped text elements and a program for controlling browsing and editing the editable form data; and transmitting the generated data of the browsing screen to the web browser of the client apparatus.

8. A method of controlling an information processing apparatus, the method comprising:

generating form data in a PDF format using a virtual printer that processes rendering commands, wherein the rendering commands are obtained by performing an overlay process that superimposes form information and field data of a form;

acquiring, from the rendering commands obtained while the overlay process is performed, region coordinates information of each field into which each character string of the field data is rendered in the overlay process, wherein the region coordinates information is acquired without analyzing the generated form data in the PDF format;

storing, in an information file, the acquired region coordinates information in association with each character string to be rendered in each said field, wherein the information file is different from the generated form data;

converting the generated form data into editable form data having a scalable vector graphics (SVG) format, wherein the editable form data having the SVG format is able to be directly edited on a web browser of a client apparatus;

acquiring character string elements from the editable form data;

grouping, in the editable form data having the SVG format, the acquired character string elements into text elements based on the region coordinates information of each character string stored in the information file;

generating data of a browsing screen, wherein the generated data of the browsing screen comprises the editable form data having the SVG format including the grouped text elements and a program for controlling browsing and editing the editable form data; and transmitting the generated data of the browsing screen to the web browser of the client apparatus.

* * * * *